(12) United States Patent
Anvekar

(10) Patent No.: US 6,658,574 B1
(45) Date of Patent: Dec. 2, 2003

(54) METHOD FOR NON-DISCLOSING PASSWORD ENTRY

(75) Inventor: Dinesh Kashinath Anvekar, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/337,720

(22) Filed: Jun. 21, 1999

(51) Int. Cl.[7] .............. H04L 9/00; H04L 9/32; G06F 11/30; G06F 12/14; H04K 1/00
(52) U.S. Cl. .............. 713/202; 713/183; 713/184; 380/258
(58) Field of Search .............. 713/202, 183, 713/184; 380/258

(56) References Cited

U.S. PATENT DOCUMENTS

| | | | | |
|---|---|---|---|---|
| 3,675,513 A | * | 7/1972 | Flanagan et al. | 379/93.18 |
| 4,100,402 A | * | 7/1978 | Lundstrom et al. | 235/145 R |
| 4,101,934 A | * | 7/1978 | Fukuoka | 341/63 |
| 5,428,349 A | * | 6/1995 | Baker | 340/5.54 |
| 6,209,104 B1 | * | 3/2001 | Jalili | 713/202 |

* cited by examiner

Primary Examiner—Gilberto Barrón
Assistant Examiner—Benjamin E. Lanier
(74) Attorney, Agent, or Firm—Whitham, Curtis & Christofferson, P.C.; T. Rao Coca

(57) ABSTRACT

Password entry is done by displaying to a user distinct codes corresponding to characters in the user's password. The user then serially enters codes corresponding to characters while concealing the entry. Only a limited number of keys are used for password entry. In one example, two keys, a "HIT" key and a "NEXT" key, are provided within a concealing hood, and the password in entered serially as a number of "HIT" key hits. The user is prompted to enter digits corresponding to symbols of his or her password with a display of unique m-ary number codes assigned mutually exclusively to different characters. The scheme can be easily implemented in existing computer systems entirely through a conventional ASCII keyboard or mouse, by using adjacent keys on the keyboard or left and right mouse buttons. As the method requires only a few keys, concealing the keys to prevent viewing of key entry is possible.

18 Claims, 4 Drawing Sheets

FIG. 1

| S1 | S2 | S3 | S4 | S5 | S6 | S7 | S8 |
|----|----|----|----|----|----|----|----|
| 412 | 113 | 311 | 141 | 112 | 231 | 111 | 312 |

FIG. 2

| S1 | S2 | S3 | S4 | S5 | S6 | S7 | S8 |
|----|----|----|----|----|----|----|----|
| 142 | 411 | 222 | 123 | 331 | 442 | 213 | 334 |

FIG. 3

| S1 | S2 | S3 | S4 | S5 | S6 | S7 | S8 |
|----|----|----|----|----|----|----|----|
| 312 | 433 | 131 | 111 | 414 | 333 | 212 | 314 |

METHOD FOR NON-DISCLOSING PASSWORD ENTRY

BACKGROUND OF THE INVENTION

1. Field of the Invention

The present invention generally relates to secure password or passcode entry systems and, more particularly, to a new method of password or passcode entry which is very secure from password or passcode detection by casual observation of key hits during entry.

2. Background Description

One of the most popularly used and simple methods for providing access to computer systems, secure areas, financial transaction systems and others is by password entry through a keyboard or keypad. A visual display unit is often associated with such systems. For example, a standard method for password entry routinely used for various access control situations is the entry of an alphanumeric password through a standard ASCII (American Standard Code for Information Interchange) keyboard or a numeric keypad. The user's key entry is not revealed on the screen directly, but an asterisk "*" or some such character is displayed in response to each entry of a character.

In many of these systems, it is possible for an unauthorized observer to note the sequence of key entries and make a quick guess of the valid password. While frequent change of password by the authorized person can prevent this possibility to some extent, an unauthorized person can still exploit the access to the systems before the password is changed. Also, in electronic banking (e-banking) systems such as automatic teller machines (ATMs), the user's password or passcode cannot usually be changed frequently. Therefore, it is highly desirable that any password or passcode entry system be secure against disclosure to observers. Further, such systems must also be immune to observation of keyboard or keypad entry and the visual display units by using secretly installed video cameras. Unauthorized persons can analyze video recordings at leisure and make out the password or passcode possibly with the help of a computer program. To date several proposals exist to address this problem, but they are generally open to disclosure through video camera recordings, even though they make it very difficult for casual observers to detect the password or passcode.

For example, U.S. Pat. No. 5,428,349 to Baker proposes a non-disclosing password entry system. Here, the password entry method is effected by displaying pseudo-random two-dimensional array of characters. The user is required to enter the row (or column) number in which the user's password character appears. For entry of each character, a different array of characters is displayed to the user. Thus, this method does not directly reveal the password characters, but only reveals a set of characters among which a valid character exists. In the Baker method, with 26 alpha characters and 10 numeric characters, a 6×6 character array is displayed, and each entry indicates 6 characters. While this method is claimed to be relatively secure from password detection by an unaided onlooker, a video recording of display and keyboard and later analysis can lead to password detection with some effort. This method has a drawback that for each character entry, the user has to visually inspect the 6×6 pseudo-random character array and identify the valid character. This can be quite tedious and time consuming for an average user. Also, another drawback of this method is that for any given password, there can be several others which map to the same set of rows (or columns), and this makes it less secure from random password guessing.

U.S. Pat. No. 5,276,314 to Martino et al. proposes an identity verification system wherein a two-dimensional array of characters or symbols is displayed to the user. Keys are provided here to effect certain transformations of the array elements. For example, pressing a "row" key can circularly shift the characters in that row by one position to the left. By such transforming steps, the user is required to bring the characters of his or her password in certain known positions in the array. From a practical point of view, a 4×4 or 5×5 array is the maximum array size that may be acceptable for manipulation by an average user. The method is quite secure from a casual onlooker but is still susceptible to code detection through video recordings. Also, the user is required to identify his or her password characters and successively manipulate the entries. This amounts to solving some sort of puzzle and, therefore, the method is generally not acceptable for use by an average user.

It should be noted that in password entry methods such as discussed above, it is generally difficult to prevent videographing of the keyboard by covering the keyboard because the user needs to see the keys that he or she is going to press. Considering the limitations of the aforementioned methods, it is clear that there is a need for a new method for password or passcode entry which is secure from detection even with the aid of a video recording system.

SUMMARY OF THE INVENTION

It is therefore an object of the present invention to provide a new method of password or passcode entry that is very secure from password detection by either casual observation or video recording of key hits during password or passcode entry.

According to the invention, password entry is done by displaying to a user distinct codes corresponding to characters in the user's password. The user then serially enters codes corresponding to characters while concealing the entry. Only a limited number of keys are used for password entry. In one example, two keys, a "HIT" key and a "NEXT" key, are provided within a concealing hood, and the password in entered serially as a number of "HIT" key hits. The user is prompted to enter digits corresponding to symbols of his or her password with a display of unique m-ary number codes assigned mutually exclusively to different characters. The scheme can be easily implemented in existing computer systems entirely through a conventional ASCII keyboard or mouse, by using adjacent keys on the keyboard or left and right mouse buttons. As the method requires only a few keys, concealing the keys to prevent viewing of key entry is possible.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is an example display presented to a user for a first symbol entry according to the method of the invention;

FIG. 2 is an example display presented to a user for a second symbol entry;

FIG. 3 is an example display presented to a user for a third symbol entry;

DETAILED DESCRIPTION OF PREFERRED EMBODIMENTS OF THE INVENTION

In the method of password entry according to the present invention, the characters (or symbols) used to form passwords are displayed to the user in a fixed, known format. Therefore, the user can easily locate the characters or symbols corresponding to his or her password. In this description, the terms "characters" and "symbols" are used interchangeably, and while in general usage, "characters" refer to alphanumeric characters, without loss of generality, other characters or symbols may be used in the practice of the invention.

In the display, for each character corresponding to his or her password, a unique n-digit, m-ary code word is associated. The user has to enter the n digits of the m-ary code for each character of the password. Also, for each character entry, the m-ary codes corresponding to the different characters are pseudo-randomly associated so that detection of password by repeated long term observations is prevented. For sake of simplicity in explanation, an example system with eight symbols S1 to S8 is considered in the following description. Also, a 3-digit quaternary code with digits 1, 2, 3, and 4 is assumed. With this code system, it is easy to see that 64 (=$4^3$) different codes given in Table 1 are possible. But, for the assumed symbol set, only eight out of these 64 codes are required for each display frame. The new method of password entry is now explained assuming that the user password is S3 S6 S1.

specifies a unique character during each entry step. Further, it should be noted that for each character entry step, the codes are assigned to the symbols mutually exclusively by choosing pseudo-randomly from the possible set of codes. For instance, in the above example, the codes assigned to symbol S1 for the three steps are 412, 142 and 312 which are pseudo-randomly chosen from the 64 possible codes, and not assigned to any other symbol during the respective steps. Having thus explained the process of code assignment to the characters (symbols), the method of code entry is now described.

Figure 4:
FIG. 4 is an illustration of two keys required to enter m-ary codes in the practice of the invention.
Figure 5:
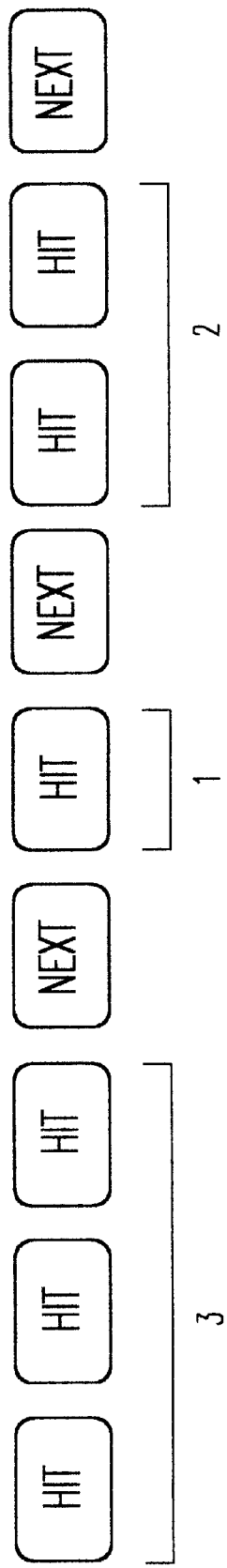
FIG. 5 is an illustration of the sequence of key hits of the two keys in FIG. 4 to enter an example code.

The codes corresponding to the user's password characters are entered with the help of two keys, "HIT" and "NEXT", placed as shown schematically in FIG. 4. The method of code entry is as follows. Suppose the code to be entered is 312. Then, each of the digits is entered by pressing the "HIT" key the number of times indicated by the digit, and each digit entry is terminated by pressing the "NEXT" key. Thus, the sequence of key kits for entering the code 312 is as shown schematically in FIG. 5. As only two keys are involved, the user can either use a single finger or the index and middle fingers to operate the "HIT" and "NEXT" keys, respectively.

Figure 6:
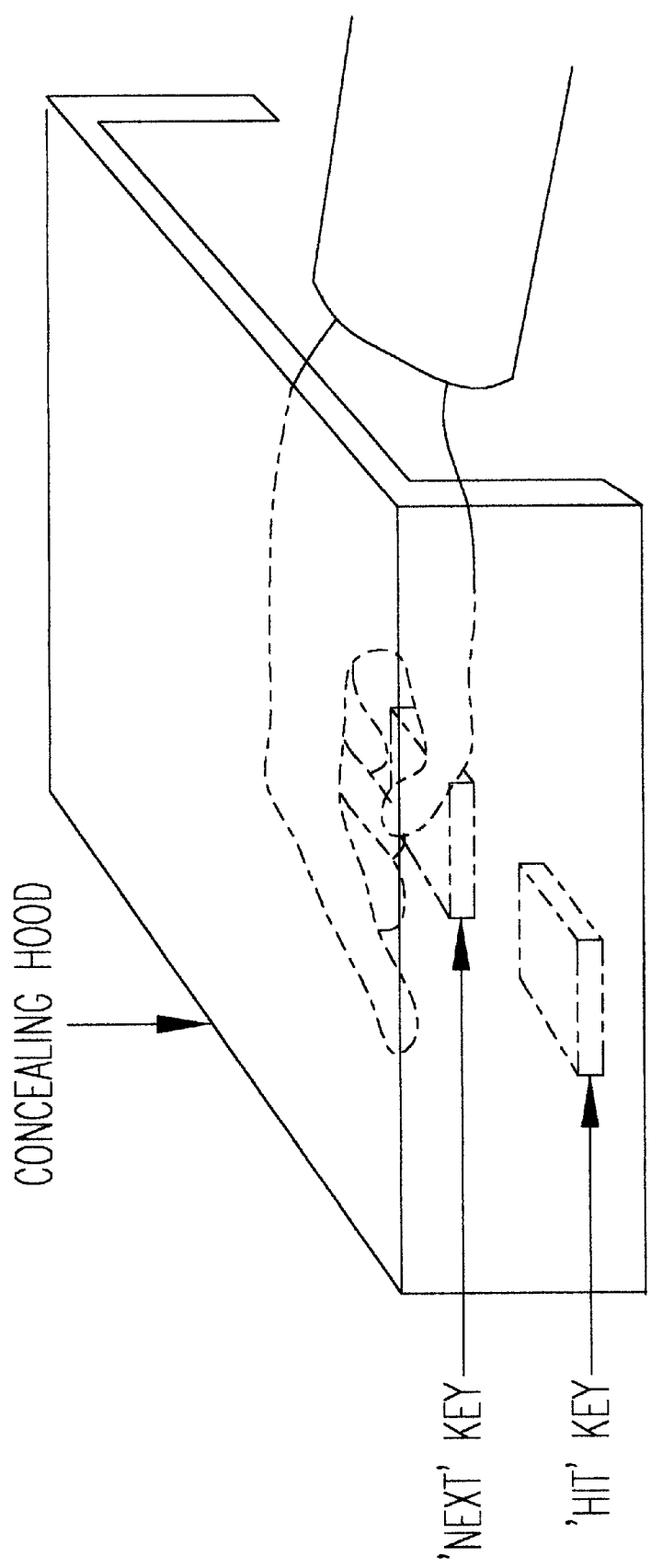
FIG. 6 is a pictorial diagram showing concealment of keys to prevent videographing.

From the above description, it can be easily understood that it is practically very difficult for an unauthorized observer to figure out the password by observing the key hits on the two keys. Also, it is very easy in practice to prevent videographing of key hit sequences by concealing the keys with a hood as shown in FIG. 6. Concealment of the keys with a hood is possible in this case as there are only two keys and the user need not see them during entry of the codes, much as a user need not see the brake and accelerator pedals of a car he or she is driving.

In the above description, a quaternary number system has been assumed for representing the codes. However, it is possible in general to use any m-ary number system. But, as the user has to press the "HIT" key the same number of times

TABLE 1

Set of 64 possible quaternary codes with digits 1, 2, 3, and 4

| 111 | 112 | 113 | 114 | 121 | 122 | 123 | 124 | 131 | 132 | 133 | 134 | 141 | 142 | 143 | 144 |
| 211 | 212 | 213 | 214 | 221 | 222 | 223 | 224 | 231 | 232 | 233 | 234 | 241 | 242 | 243 | 244 |
| 311 | 312 | 313 | 314 | 321 | 322 | 323 | 324 | 331 | 332 | 333 | 334 | 341 | 342 | 343 | 344 |
| 411 | 412 | 413 | 414 | 421 | 422 | 423 | 424 | 431 | 432 | 433 | 434 | 441 | 442 | 443 | 444 |

Referring now to the drawings, and more particularly to FIG. 1, there is shown an example display presented to the user for entry of the first symbol of his or her password. Now, the user finds that the quaternary code corresponding to the first symbol S3 of his or her password is 311. This code is entered by the user by using two concealed keys as described later. Next, the system refreshes the display for the entry of the second symbol by choosing a different set of quaternary codes for the symbols S1–S8. An example display for this symbol entry is shown in FIG. 2. Now, the code corresponding to the user's second password symbol S6 is 442, which is entered as earlier by using two keys. Similarly, a third display is presented to the user as shown in FIG. 3 for entry of his or her third password symbol.

It is to be noted from the above example that every time the display consists of password symbols in fixed, known positions. Therefore, unlike password entry schemes such as described in the patents to Baker and Martino et al., it is very easy for the user to locate the valid character (symbol) at each step. Also, unlike Baker's method, the user here as a digit, from practical considerations, a maximum of 4 key hits for any digit is acceptable. Thus, the acceptable number systems for codes are binary, ternary, and quaternary number systems. However, as it is desirable to have as few digits per code as possible, the most appropriate choices are ternary and quaternary codes. To represent 64 alphanumeric and other characters, 4 and 3 digits are required respectively in ternary and quaternary number systems. It is to be noted that, in general, for an m-ary number system, the digits chosen are 1, 2, 3 . . . , m.

While separate "HIT" and "NEXT" keys have been mentioned as required for the new password entry method, it is also possible to use any already existing keys in a system. For instance, the "single/double quote" and "Enter" keys which appear side by side on the standard ASCII keyboard can be used as "HIT" and "NEXT" keys, respectively, during the password entry process. In this case, it is easy to conceal the keys during password entry even with either of the user's hands. Another alternative is to use the mouse to enter the codes. Here, the left mouse button can be used as the "HIT" key and the right mouse button can be used as the "NEXT" key. Also, it is very easy for users to generate the number of key hits with the familiar "double click". For instance, digit 4 can be entered as two double clicks. Further, a concealing hood for the mouse can be provided very easily in practice. Another advantage of using the mouse is that in applications which are menu-driven, the keyboard can be dispensed with and only the mouse could be used to enter the password.

It is also possible to enter the m-ary codes with a single "HIT" key and eliminate the "NEXT" key. In this method, the user is given a visual "ON" signal indication on the display screen or elsewhere to indicate that an m-ary digit may be entered by hitting the "HIT" key the number of times as the digit. After the first key hit, the "ON" signal is turned off after a period slightly more than the typical time taken to hit the key m times. For example, with quaternary codes, the m value is 4, and the "ON" signal time after the first key hit is kept slightly more than the time taken to hit the key four times. After this time period, a short blank period with "OFF" signal indication is provided. The next m-ary digit can be entered only after the "ON" signal indication appears again. It is also possible to provide a short audio beep when the "ON" signal is turned off. This helps a user to understand that the system has accepted the digit entry. This method reduces the number of key hits by n as compared to the method with "HIT" and "NEXT" keys, where n is the number of digits in the code. For example, with a requirement of a minimum of 36 symbols (10 numeric and 26 alpha characters), the reduction in the number of key hits for binary, ternary and quaternary number systems is 6, 4 and 3, respectively. But, this scheme takes a longer period to enter the codes as the same "ON" signal expiration period is provided for every digit.

As already mentioned, binary, ternary and quaternary systems are practically useful choices to represent alphanumeric symbols used in passwords. With the method of code entry described above, the minimum and maximum number of key hits per symbol are as given in Table 2. As seen here, the quaternary number system generally requires lesser number of key hits.

TABLE 2

Minimum and maximum number of key hits per symbol

| Number System (Digits) | Number of Key Hits Per Symbol | | | |
|---|---|---|---|---|
| | Minimum | | Maximum | |
| | With Hit & Next Keys | With Hit Key Only | With Hit & Next Keys | With Hit Key Only |
| Binary (1,2) | 12 | 6 | 18 | 12 |
| Ternary (1,2,3) | 8 | 4 | 16 | 12 |
| Quaternary (1,2,3,4) | 6 | 3 | 15 | 12 |

Figure 7:
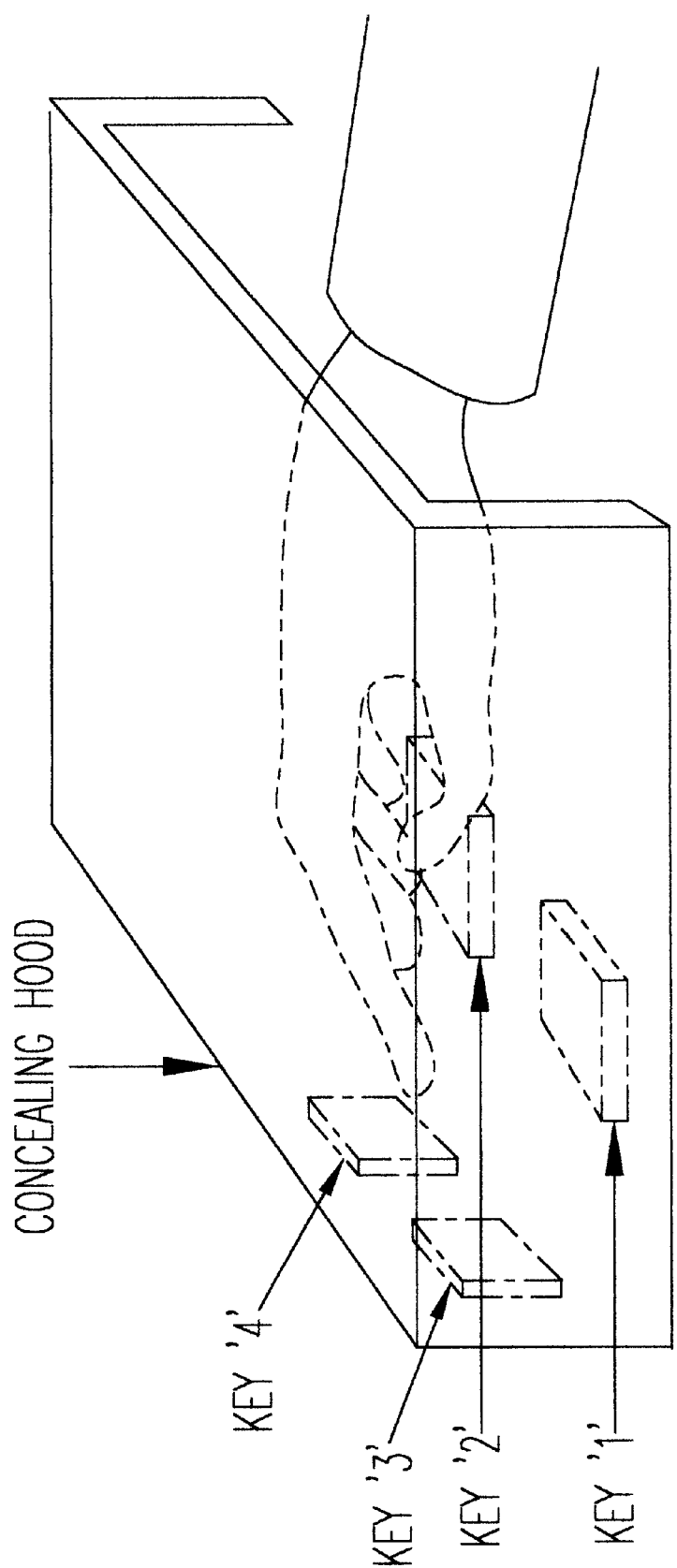
FIG. 7 is a pictorial diagram, similar to FIG. 6, showing distinctive placement of quaternary keys within the concealing hood.

With only three digits required to represent an alphanumeric character, the quaternary number system is the most appropriate choice in this application. However, it is desirable to minimize the number of key hits per symbol. Keeping this in view, an alternative code entry method is now described. In this method, the number of physical keys required to enter a digit of the chosen m-ary number is m. Thus, the number of keys required when using binary, ternary and quaternary number systems is 2, 3 and 4, respectively. The digit of the m-ary code is entered by pressing the corresponding m-ary digit key. However, a problem that needs to be addressed in this scheme is that of enabling a user to easily distinguish the keys which are concealed with a hood. While two keys, as in the case of the binary number system, can be easily distinguishable by their relative positions, it is generally difficult to distinguish three or more keys when they are in the same plane and hidden under a hood. Therefore, in this method it is proposed to place the keys in a physically undistinguishable position and preferably in different planes inside the hood as shown in FIG. 7 for a quaternary coding scheme. It may be noted that in this method, the number of key hits per symbol is a constant equal the number of digits used to represent the password symbols. Thus, the number of key hits per symbol in this case for binary, ternary and quaternary number systems is 6, 4 and 3, respectively. Therefore, even in this method, the quaternary coding scheme is the most appropriate choice. For comparison, it may be noted that for 36 alphanumeric symbols, the 5-ary number system also requires 3 hits per symbol but requires one more key to enter the code. However, with five or more keys, it is generally difficult for average users to distinguish them when hidden under a hood.

Other schemes are also possible to distinguish keys which may be used alone or in combination with the schemes already discussed. For example, each of the keys could have different, tactilely distinguishable shapes. In the case of the quaternary number system, these could conveniently be the shapes of the "+", "Δ", "▮", and "■". Other shapes will suggest themselves to those skilled in the art. Alternatively, the keys could be arranged on a handle, like a joystick handle, so that each of the four keys in a quaternary system are positioned under a different finger tip.

The method of password entry is very secure from password detection by casual observation of key hits during password entry. As the method requires only a few keys, concealing the keys to prevent viewing key entry is possible. The method can coexist with conventional password entry schemes as an option to be used when absolute security is required. As compared to other password entry schemes, the new method is very easy to use in practice even by average users.

While the invention has been described in terms of preferred embodiments, those skilled in the art will recognize that the invention can be practiced with modification within the spirit and scope of the appended claims.

Having thus described my invention, what I claim as new and desire to secure by Letters Patent is as follows:

1. A method of password entry comprising the steps of:

displaying to a user distinct codes corresponding to characters in the user's password along with the characters; and receiving codes corresponding to characters entered serially by the user while concealing the entry on a number of keys less than a number of symbols in a set of symbols from which the user's password is composed;

wherein codes corresponding to characters are entered as a number of key hits; and wherein a user enters each digit of a password character by pressing a first key a number of times corresponding to the digit, and by terminating the digit entry by pressing a second key.

2. A method of password entry comprising the steps of:

displaying to a user distinct codes corresponding to characters in the user's password along with the characters; and receiving codes corresponding to characters entered serially by the user while concealing the entry on a number of keys less than a number of symbols in a set of symbols from which the user's password is composed;

wherein codes corresponding to characters are entered as a number of key hits; and further comprising the step of providing a user with a visual "ON" signal to indicate that a digit may be entered and wherein a user enters each digit of a password character by pressing a single key a number of times corresponding to the digit.

3. The password entry method recited in claim 2, wherein the "ON" signal is turned off after a period and then turned on again to indicate that a next digit may be entered by the user until all the digits have been entered.

4. The password entry method recited in claim 3, further comprising the step of generating an audible signal to the user when the "ON" signal is turned off to indicate to the user acceptance of the digit entry.

5. A method of password entry comprising the steps of:

displaying to a user distinct codes corresponding to characters in the user's password along with the characters; and receiving codes corresponding to characters entered serially by the user while concealing the entry on a number of keys less than a number of symbols in a set of symbols from which the user's password is composed;

wherein a set of characters that can be used to form passwords are displayed to the user in fixed, known position on a display screen.

6. The password entry method recited in claim 5, wherein the set of characters are displayed along with unique m-ary number codes.

7. The password entry method recited in claim 5, wherein the m-ary number code is a binary code.

8. The password entry method recited in claim 5, wherein the m-ary number code is a ternary code.

9. The password entry method recited in claim 5, wherein the m-ary number code is a quaternary code.

10. The password entry method recited in claim 5, wherein the m-ary codes are assigned mutually exclusively to the different characters by choosing pseudo-randomly from a set of all possible m-ary codes.

11. The password entry method recited in claim 5, wherein a user enters each digit of the m-ary code of a password character by pressing a first key a number of times corresponding to the digit, and by terminating the digit entry by pressing a second key.

12. The password entry method recited in claim 11, wherein any two keys available on a standard keyboard are used during password entry as the first and second keys.

13. The password entry method recited in claim 11, wherein left and right mouse buttons are used as the first and second keys.

14. The password entry method recited in claim 11, wherein the first and second keys are concealed by a hood.

15. The password entry method recited in claim 7, wherein m physical keys are provided for the user to enter a digit of the m-ary code, and an m-ary digit is entered by pressing a key corresponding to the m-ary digit.

16. The password entry method recited in claim 15, wherein the m physical keys are concealed by a hood in physically distinguishable positions.

17. The password entry method recited in claim 16, wherein the physically distinguishable positions are located in more than one plane.

18. The password entry method recited in claim 15, wherein the m physical keys are concealed by a hood and have tactilely distinguishable shapes.

* * * * *